United States Patent
Braun et al.

(10) Patent No.: US 9,517,939 B2
(45) Date of Patent: Dec. 13, 2016

(54) METHOD OF ENHANCING THE CONNECTIVITY OF A COLLOIDAL TEMPLATE, AND A HIGHLY INTERCONNECTED POROUS STRUCTURE

(75) Inventors: Paul V. Braun, Savoy, IL (US); Hui Gang Zhang, Urbana, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 281 days.

(21) Appl. No.: 13/467,419

(22) Filed: May 9, 2012

(65) Prior Publication Data
US 2013/0302669 A1  Nov. 14, 2013

(51) Int. Cl.
| | |
|---|---|
| C01B 33/18 | (2006.01) |
| H01M 4/80 | (2006.01) |
| H01M 4/66 | (2006.01) |
| C08G 77/04 | (2006.01) |

(52) U.S. Cl.
CPC .............. *C01B 33/18* (2013.01); *H01M 4/801* (2013.01); *C01P 2004/03* (2013.01); *C01P 2004/34* (2013.01); *C08G 77/04* (2013.01); *H01M 4/661* (2013.01); *H01M 4/667* (2013.01); *Y10T 428/249921* (2015.04)

(58) Field of Classification Search
CPC .................. H01M 10/0525; H01M 2004/021; H01M 2004/025; H01M 4/80–4/805; H01M 4/801; H01M 4/661; H01M 4/667; C01B 33/18; Y10T 428/249921; C08G 77/04; C01P 2004/34; C01P 2004/03

USPC .... 429/209, 122; 423/335; 528/33; 428/221; 427/58
See application file for complete search history.

(56) References Cited

U.S. PATENT DOCUMENTS

| | | | | |
|---|---|---|---|---|
| 6,680,013 | B1 | 1/2004 | Stein et al. | 264/44 |
| 7,087,348 | B2 * | 8/2006 | Holman et al. | 429/209 |
| 2004/0018430 | A1 * | 1/2004 | Holman et al. | 429/233 |
| 2010/0015523 | A1 * | 1/2010 | Ryu et al. | 429/185 |
| 2010/0068623 | A1 * | 3/2010 | Braun et al. | 429/219 |
| 2013/0302669 | A1 * | 11/2013 | Braun et al. | 429/209 |

OTHER PUBLICATIONS

Günther, Schuh. et al, Future Trends in Production Engineering, 2013, Springer, 2012, pp. 4-5.*
Jiang P, Hwang KS, Mittleman DM, Bertone JF, Colvin VL (1999) Template-directed preparation of macroporous polymers with oriented and crystalline arrays of voids. J Am Chem Soc 121:11630.*
(Continued)

*Primary Examiner* — Nicholas P D'Aniello
*Assistant Examiner* — Philip A Stuckey
(74) *Attorney, Agent, or Firm* — Brinks Gilson & Lione (57) ABSTRACT

A method of enhancing the connectivity of a colloidal template includes providing a lattice of microparticles, where the microparticles are in contact with adjacent microparticles at contact regions therebetween, and exposing the lattice to a solution comprising a solvent and a precursor material. The solvent is removed from the solution, and the precursor material moves to the contact regions. A ring is formed from the precursor material around each of the contact regions, thereby creating interconnects between adjacent microparticles and enhancing the connectivity of the lattice.

18 Claims, 4 Drawing Sheets

(56) References Cited

OTHER PUBLICATIONS

Li, Qin, et al. "Porous networks through colloidal templates." Templates in Chemistry III. Springer Berlin Heidelberg, 2009. 135-180.*
Banhart, John, "Manufacture, Characterisation and Application of Cellular Metals and Metal Foams," *Progress in Materials Science* 46 (2001) pp. 559-632.
Ergang, Nicholas S. et al., "Effect of a Macropore Structure on Cycling Rates of $LiCoO_2$," *Journal of the Electrochemical Society* 152, 10 (2005) pp. A1989-A1995.
Ergang, Nicholas S. et al., "Photonic Crystal Structures as a Basis for a Three-Dimensionally Interpenetrating Electrochemical-Cell System," *Advanced Materials* 18,13 (2006) pp. 1750-1753.
Ergang, Nicholas S. et al., "Fabrication of a Fully Infiltrated Three-Dimensional Solid-State Interpenetrating Electrochemical Cell," *Journal of the Electrochemical Society* 154, 12 (2007) pp. A1135-A1139.
Paserin, Vladimir et al., "CVD Technique for Inco Nickel Foam Production," *Advanced Engineering Materials* 6, 6, (2004) pp. 454-459.
Stein, Andreas et al., "Morphological Control in Colloidal Crystal Templating of Inverse Opals, Hierarchical, Structures, and Shaped Particles," *Chemistry of Materials* 20, 3, (2008) pp. 649-666.
Wang, Zhiyong et al., "Porous Carbon/Tin (IV) Oxide Monoliths as Anodes for Lithium-Ion Batteries," *Journal of the Electrochemical Society* 155, 9 (2008) pp. A658-A663.

* cited by examiner

METHOD OF ENHANCING THE CONNECTIVITY OF A COLLOIDAL TEMPLATE, AND A HIGHLY INTERCONNECTED POROUS STRUCTURE

FEDERALLY SPONSORED RESEARCH OR DEVELOPMENT

This invention was made with government support under contract number FA9550-08-1-0407 awarded by the Air Force Office of Scientific Research. The U.S. Government has certain rights in this invention.

TECHNICAL FIELD

This disclosure is related generally to monolithic porous structures formed using colloidal templating methods, and more particularly to methods of improving the connectivity of a colloidal template.

BACKGROUND

Highly-interconnected porous structures have many applications in the fields of catalysis, sensors, electrochemical energy storage (batteries), dye sensitized solar cells, and biomedical devices such as hip implants. For example, porous conductive current collectors are used in commercially available rechargeable batteries, such as nickel metal hydride (NiMH) batteries. Many commercial NiMH battery cathodes employ sintered plaque or nickel foam current collectors; however, the performance of nickel foam is limited by large pore sizes and a broad pore size distribution. When the foam is impregnated with nickel hydroxide, the charge storage media, protons and electrons, have to travel a long distance between the nickel metal and the $Ni(OH)_2$/electrolyte interface.

Self-assembled colloids may be employed as a template for the formation of a highly porous battery electrode, as described in U.S. Patent Application Publication 2010/0068623A1, "Porous Battery Electrode for a Rechargeable Battery and Method of Making the Electrode," published on Mar. 18, 2010, and hereby incorporated by reference in its entirety. Once formed, a lattice of microparticles (the "colloidal template") may be infiltrated or coated with a suitable material (e.g., a conductive metal), and then removal of the microparticles leads to a porous structure which is an inverse of the template.

Such a porous structure may be characterized by its pore (or void) volume fraction (porosity), pore size, interconnectivity, neck openness, tortuosity, and pore hierarchy. Typically, most attention is paid to controlling the porosity and the pore size distribution. However, the remaining parameters may play even more important roles in the transport-related physiochemical properties of functional porous materials. Since closed pores are not accessible for chemical reactants, the presence of passageways ("necks") between voids and the extent of interconnectivity may be critically important. If the neck size between two adjacent voids is small, what may be referred to as the "ink bottle effect" limits the species exchanges between them.

Because the contact area between spherical microparticles of a colloidal template is very small, there may be only a small passageway or neck between adjacent voids in the resulting inverse structure. As explained, the small size of the necks may inhibit mass transport of various chemical species. Sluggish mass transport may be very unfavorable for chemical reactions that rely on the porous foam.

BRIEF SUMMARY

Described herein is a process technology that enables a porous structure having enlarged passageways ("necks") between adjacent voids to be fabricated. The process begins with a colloidal template comprising a lattice of microparticles. Contact regions between the microparticles of the lattice are enlarged as part of the method, which leads to larger necks between adjacent voids when the inverse porous structure is obtained.

The method of enhancing the connectivity of a colloidal template includes providing a lattice of microparticles, where the microparticles are in contact with adjacent microparticles at contact regions therebetween, and exposing the lattice to a solution comprising a solvent and a precursor material. The solvent is removed from the solution, and the precursor material moves to the contact regions. A ring is formed from the precursor material around each of the contact regions, thereby creating interconnects between adjacent microparticles and enhancing the connectivity of the lattice.

A highly interconnected porous structure comprises a monolithic porous structure comprising a conductive material and including a network of substantially spherical voids therein. The voids are connected to adjacent voids by necks, and a ratio of a diameter of each of the necks to a diameter of each of the voids is at least about 0.1.

A highly porous battery electrode comprises a monolithic porous structure comprising a conductive material and including a network of substantially spherical voids therein. The voids are connected to adjacent voids by necks, where a ratio of a diameter of each of the necks to a diameter of each of the voids is at least about 0.1. The electrode further comprises an electrochemically active material deposited on the monolithic porous structure, where a thickness of the electrochemically active material is less than one-half the diameter each of the necks.

DETAILED DESCRIPTION

The method described herein is based on the application of a local deposition method to a colloidal template comprising a lattice of microparticles. "Local deposition" refers to the migration of a material to the contact regions between adjacent microparticles and the drying and/or solidification of the material into rings, as described in detail below. By employing the method described herein, the connectivity of a colloidal template may be significantly enhanced, thereby allowing a porous structure with increased neck size between adjacent pores (voids) to be formed. Such an increase is particularly advantageous if the colloidal template from which the porous structure is fabricated has a random or amorphous lattice structure, as is the case with a colloidal glass, since random structures have a reduced number of contact regions per microparticle compared to ordered (periodic) structures. A larger neck size is advantageous if not necessary to ensure that all of the microparticles of the colloidal template can be removed when the inverse porous structure is formed.

Applications in which electrons, ions, and/or molecules are transported to reaction sites over a long distance may benefit from this process technology, such as rapid charge and discharge batteries, high efficiency catalysts and sensors, and dye sensitized solar cells. Products requiring interconnected pores for other reasons, such as biomedical implants, may also be improved.

Figure 1A:
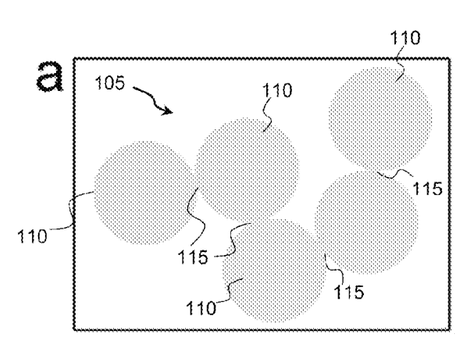
FIG. 1a is a schematic showing a randomly ordered lattice of microparticles, where the microparticles are in contact with adjacent microparticles at a plurality of contact regions therebetween.

Referring to FIG. 1a, the method includes providing a lattice 105 of microparticles 110, where the microparticles 110 are in contact with each other at contact regions 115 between adjacent microparticles 110. As used herein in reference to adjacent microparticles, "in contact" means physically touching or spaced apart by an amount no greater than about 0.2 of the microparticle diameter. The adjacent particles that are in contact may also be spaced apart by an amount no greater than about 0.1 of the microparticle diameter, alternatively no greater than about 0.05 of the microparticle diameter, or no greater than about 0.01 of the microparticle diameter. The lattice 105 may have a regular or ordered structure (i.e., a periodic or crystalline structure), or, as shown in the schematic of FIG. 1a, the lattice 105 may have a disordered or randomly ordered structure (i.e., an amorphous or glassy structure). The lattice 105 may be formed by a self-assembly process, as described further below.

Figures 1A, 1B, 1C, 1D, 1E, 1F, 1G:
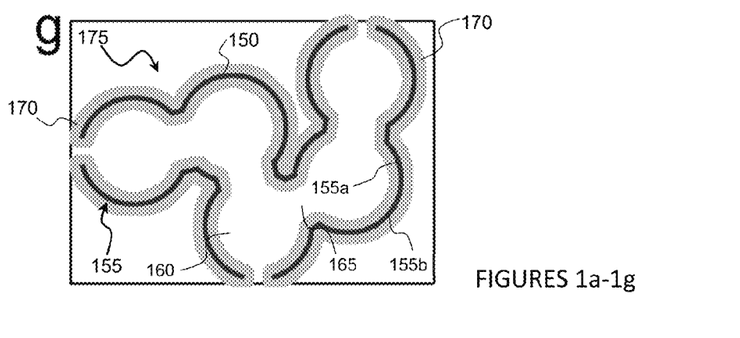
FIG. 1b is a schematic showing the lattice of FIG. 1a exposed to a solution comprising a solvent and a precursor material.
FIG. 1c is a schematic showing the formation of rings at the contact regions between adjacent microparticles upon removal of the solvent from the solution, thereby forming interconnects between the microparticles.
FIG. 1d is a schematic showing the result of transforming the rings of FIG. 1C into calcined rings, where in this example the calcined rings comprise the same material as the microparticles of the lattice, to form robust interconnects.
FIG. 1e is a schematic of the microparticles and interconnects coated with a conductive material after infiltration of the lattice.
FIG. 1f is a schematic of the monolithic porous structure comprising the conductive material that remains after the microparticles and interconnects are removed.
FIG. 1g is a schematic of the monolithic porous structure comprising the conductive material after deposition of an electrochemically active material.
Figure 1B:
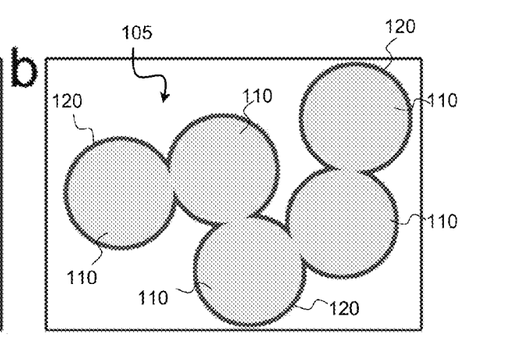
Figure 1C:
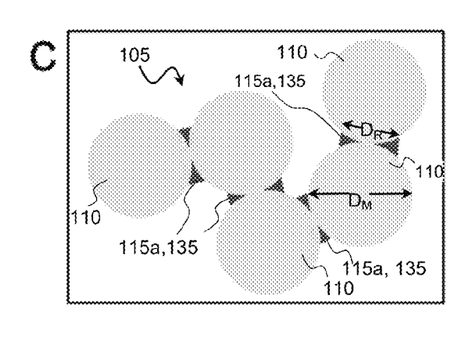
Figure 1D:
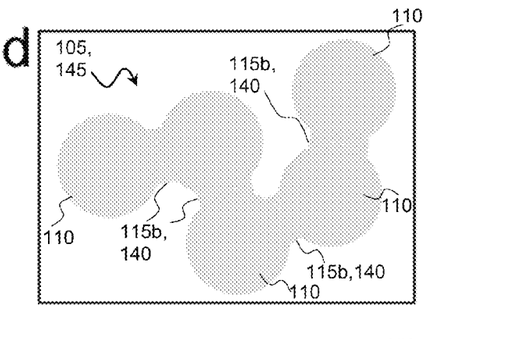
Figure 1E:
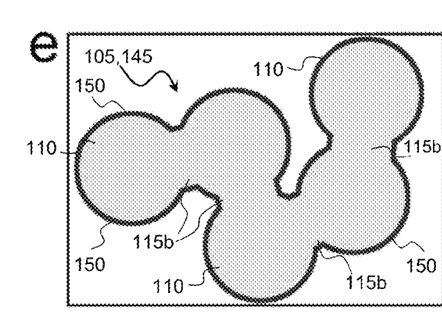
Figure 1F:
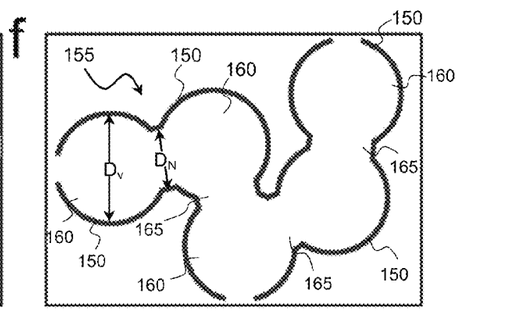

As shown schematically in FIG. 1b, the lattice 105 of microparticles 110 may be exposed to a solution 120 comprising a solvent and a precursor material. The precursor material is typically present in the solution at a concentration of from about 1 wt. % to about 20 wt. %. For example, the concentration of the precursor material in the solution 120 may be at least about 3 wt. %, at least about 5 wt. %, at least about 8 wt. %, or at least about 12 wt. % Generally, the concentration of the precursor material in the solution 120 is no more than about 20 wt. %, or no more than about 15 wt. %. In some embodiments, the solution 120 may further include other additives, such as a curing agent. The microparticles 110 may be immersed in the solution 120, or the solution 120 may be coated onto the microparticles 110.

It is contemplated that the lattice 105 of microparticles 110 may be assembled from a solution 120 that includes the dissolved or dispersed precursor material and any additives, such that the providing of the lattice 105 (as illustrated in FIG. 1a) and the exposing of the microparticles 110 to the solution 120 (as shown in FIG. 1b) may be carried out in a single step of the method. Alternatively, the lattice 105 of microparticles 110 may be formed in a first step from a first solution (e.g., by a self-assembly process) and then exposed in a second step to a second solution containing the dissolved precursor material and optional additives. As would be recognized by one of ordinary skill in the art, the term "solution" is used generally in reference to a liquid that may include one or more dissolved and/or suspended components.

After exposing the lattice 105 of microparticles 110 to the solution 120, the solvent is removed and the precursor material and the optional curing agent travel to the contact regions 115 as a consequence of capillary forces. The removal of the solvent may entail evaporation at ambient temperature or at an elevated temperature. The solvent employed for the method is preferably one that dissolves the precursor material and any additives, but does not dissolve the material of the microparticles 110. As or after the solvent is removed, a ring 135 is formed from the precursor material 130 around each of the contact regions 115, as shown schematically in FIG. 1c, thereby creating larger contact regions or interconnects 115a between adjacent microparticles and enhancing the connectivity of the lattice 105. The rings typically comprise a solid phase of a material and thus may be referred to as "solid-phase rings" in some embodiments.

The formation of the rings 135 may include curing the precursor material with a heat treatment. To form polymeric rings, for example, the precursor may be cured at a temperature of from about 25° C. to about 250° C. (e.g., at a temperature of at least about 75° C., or at least about 100° C., and/or typically no more than about 250° C., or no more than about 200° C.). The duration of the curing may be from about 1 min to about 24 h. Alternatively, the precursor may be cured with a chemical treatment. In some embodiments, the rings 135 may form as the solvent evaporates without any additional heat or chemical treatments.

Figure 3:
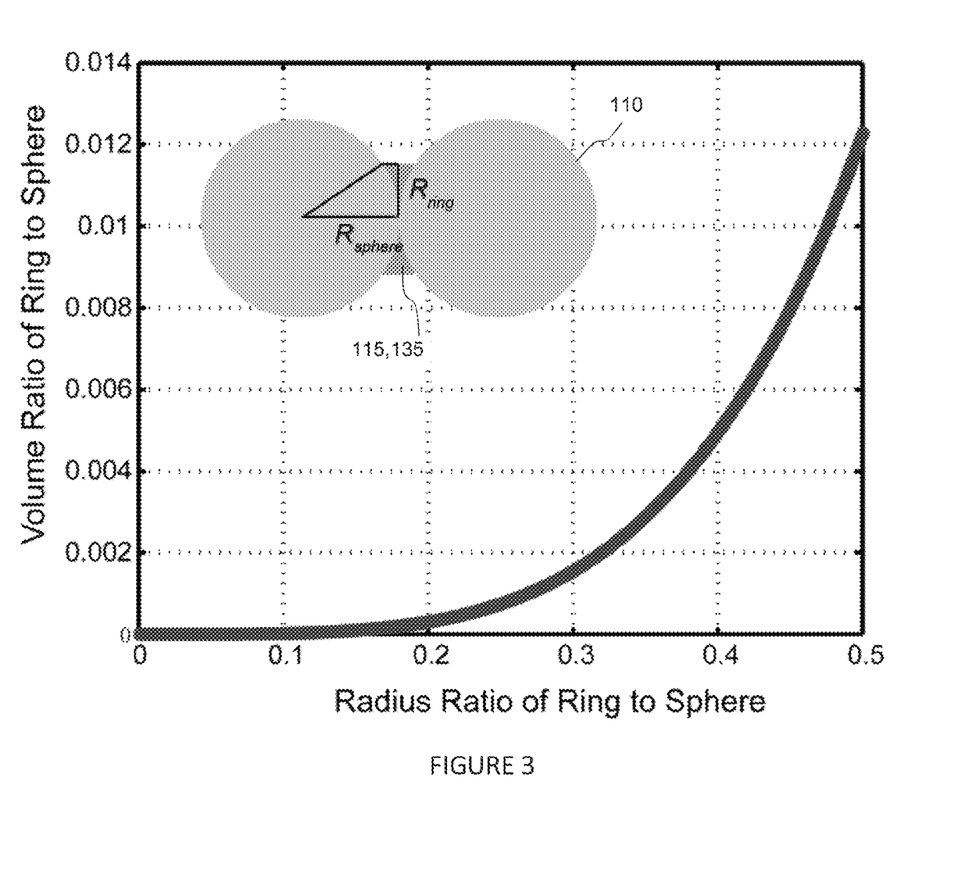
FIG. 3 shows the relationship between (a) the ratio of the volume of a ring to the volume of a microparticle and (b) the ratio of the outside radius of a ring to the radius of a microparticle.

The morphology of the rings 135, which is illustrated schematically in FIG. 1c and in FIG. 3, is defined by the amount of precursor material employed and the volume of space around the contact regions 115 between adjacent microparticles 110 where the rings 135 may form, as discussed in greater detail in Example 3 below. The rings 135 and thus the interconnects 115a may comprise a polymer, such as a silicon-containing polymer.

To quantify the connectivity of the lattice 105 of microparticles 110 due to the formation of the interconnects 115a, a ring-to-microparticle ratio ($D_R:D_M$) may be calculated, where $D_R$ represents an outside diameter of each of the rings 135 and $D_M$ represents a diameter of each of the microparticles ("microparticle diameter") 110. (Equivalently, the ring-to-microparticle ratio may be based on radii instead of diameters, that is, an outside radius of each of the rings 135 and the radius of each of the microparticles 110.)

Generally, the ring-to-microparticle ratio is at least about 0.1, and may be at least about 0.3 or at least about 0.4. Advantageously, the ratio may be at least about 0.5 or at least about 0.6. The ratio is typically no more than about 0.7 or no more than about 0.8. For example, the ring-to-microparticle ratio may be from about 0.1 to about 0.8. It is noted that the term diameter is used in reference to an average lateral size (e.g., width) of the rings or the microparticles, which generally are substantially spherical.

The method may further include, after forming the rings 135, transforming the rings 135 into calcined rings 140 comprising a material or phase different from that of the rings 135. FIG. 1d shows schematically the lattice 105 of microparticles 110 comprising the calcined rings 140. The transformation of the rings 135 to the calcined rings 140 may be carried out by heating at a temperature and in an environment sufficient to transform the material of the rings 135 ("the first material") into a different material or a different phase ("the second material"). The temperature and environment for heating may be selected based on the composition of the first material and the desired composition or phase of the second material. For example, the rings 135 may undergo a heat treatment at a temperature in the range of from about 300° C. to about 500° C. in air or another oxygen-containing environment in order to transform the silicon-containing polymer to silicon oxide (e.g., $SiO_2$) via an oxidation reaction. Alternatively, the first material may be a polymer that is transformed through a carbonization reaction into carbon. As indicated in the schematic of FIG. 1d, the first material may be transformed into a second material that is the same as the material of the microparticles 110, thereby creating a monolithic colloidal template 145 having robust interconnects 115b. For example, both the second material and the material of the microparticles may be $SiO_2$. In some embodiments, the second material has a different hardness and strength than the first material.

Referring to FIG. 1e, the method may further include infilling the lattice 105 with a conductive material 150 that conformally coats the microparticles 110 and the interconnects 115a or 115b. The infilling may take place after the rings 135 are formed, and for embodiments in which a step of transforming the rings 135 to calcined rings 145 is carried out, the infilling may take place after the transformation. After the infilling with the conductive material 150, the microparticles 110 and the interconnects 115a or 115b may be removed to obtain a monolithic porous structure 155 comprising the conductive material 150 and including (a) voids 160 defined by the microparticles 110 and (b) necks 165 between the voids defined by the interconnects 115a or 115b, as shown schematically in FIG. 1f.

To quantify the high connectivity of the monolithic porous structure due to the formation of the interconnects 115a or 115b, a neck-to-void ratio ($D_N:D_v$) may be calculated, where $D_N$ represents a width or diameter of each of the necks 165 and $D_v$ represents a width or diameter of each of the voids 160. Generally, the neck-to-void ratio is at least about 0.1, and may be at least about 0.3 or at least about 0.4. Advantageously, the ratio may be at least about 0.5 or at least about 0.6. The ratio is typically no more than about 0.7 or no more than about 0.8. For example, the neck-to-void ratio may be from about 0.1 to about 0.8. It is noted that the term diameter is used in reference to an average lateral size of the necks 165 or the voids 160, which generally are substantially spherical.

Accordingly, the method may provide a monolithic porous structure 155 comprising a conductive material 150 and including a network of substantially spherical voids 160 therein, where the voids 160 are interconnected by necks 165 and where a ratio of a diameter of the each of the necks 165 to a diameter of each of the voids 160 is at least about 0.1.

The method may also comprise, after removing the microparticles 110 and the interconnects 115a or 115b, depositing an electrochemically active material 170 on the monolithic porous structure 155. The electrochemically active material 170 may be deposited as a layer on the porous structure 155 to provide bulk-like storage capacity, while the large necks 165 and voids 160 of the underlying porous structure 155 ensure that ion and electron transfer path lengths are minimized. Referring to FIG. 1g, internal surfaces 155a and also external surfaces 155b of the conductive porous structure 155 may be covered with the electrochemically active material 170. The deposition may be carried out using a conformal deposition method or a bottom-up method. For example, the electrochemically active material 170 may be conformally deposited using a technique such as ALD or CVD, or the active material may be deposited using a bottom-up process such as electrodeposition, as further discussed below. As an alternative to depositing the electrochemically active material on the conductive porous structure, the conductive porous structure may be chemically transformed to comprise the electrochemically active material; e.g., a conductive porous structure made of nickel may be converted to NiOOH or $NiP_2$.

Accordingly, the method may enable a porous battery electrode 175 to be fabricated that includes (a) a monolithic porous structure 155 comprising a conductive material 150 and a network of substantially spherical voids 160 therein, where the voids 160 are interconnected by necks 165 and where a ratio of a diameter of each of the necks 165 to a diameter of each of the voids 160 is at least about 0.1; and (b) an electrochemically active material 170 deposited on the monolithic porous structure 155 at a thickness of less than one-half the diameter each of the necks.

As described more fully in U.S. Patent Application Publication 2010/0068623A1, the colloidal template comprising the lattice of microparticles may be formed by gravity sedimentation, vertical deposition, controlled drying, spin-coating, tape casting, microfluidic assisted packing, or a related process that allows the particles to assemble into a desired regular (crystalline) or random (glassy) configuration. Prior to assembly, the microparticles may be suspended in a solvent, such as water, an alcohol (such as ethanol or isopropanol), another organic solvent (such as hexane, tetrahydrofuran, or toluene), or mixtures thereof. If necessary, a surfactant may be added to aid in suspending the microparticles, and/or the mixture may be sonicated.

The colloidal template may include any material that may be dissolved or etched away, and/or a material that may decompose or evaporate during heating. For example, the microparticles of the colloidal template can be made from inorganic materials such as silica ($SiO_2$), borosilicate, or titania ($TiO_2$), or from organic materials such as polystyrene, polydivinylbenzene, and poly(methyl methacrylate) and their copolymers. The surfaces of the microparticles may be chemically functionalized to be stable in certain solvents, and may also be treated to change their surface energy to facilitate ring formation.

Silicon-containing polymers may be particularly advantageous for the rings. For example, the polymer may be selected from the group consisting of polysiloxanes (e.g., polydimethylsiloxane and poly(methylsilsesquioxane)), polycarbosilanes, polysilazanes, and polysilanes. Generally speaking, the rings may be made up of any of a variety of polymers, nanoparticle suspensions, and/or small molecules. Suitable materials for the rings do not evaporate or sublime rapidly and do not dissolve the colloidal particles.

The microparticles of the colloidal template may have a particle diameter of from about 0.2 micron to about 10 microns, from about 0.2 micron to about 5 microns, or from about 0.2 micron to about 2 microns. Although the microparticles need not be spherical, the problem solved by the present method is particularly advantageous with substantially spherical particles that have very small contact regions when in contact.

The colloidal template may be formed on a conductive substrate, which can act as an electrode during infilling with the conductive material, in the event that electrodeposition is employed for the infilling step. In the event that alternative deposition methods are used (chemical vapor deposition (CVD), sol-gel, atomic layer deposition (ALD), chemical bath deposition, electroless deposition, or another method), then a conductive substrate may not be necessary.

The conductive material used to infiltrate the lattice may be a metal or alloy, a compound with a high conductivity, and/or a composite including a conductive constituent, such as indium-tin oxide (ITO) or $HfB_2$. Generally speaking the conductive material may include one or more of: C, Al, Si, Ti, V, Cr, Mn, Fe, Co, Ni, Cu, Zn, Ga, Ge, As, Se, Zr, Nb, Mo, Ru, Rh, Pd, Ag, Cd, In, Sn, Sb, Te, Hf, Ta, W, Re, Os, Ir, Pt, Au, TI, Pb, and Bi. Once the monolithic porous structure is formed, the material it contains may be transformed by chemical reaction; for example, a metal may be reacted with oxygen to form a monolithic porous structure containing the corresponding oxide, reacted with sulfur (or $H_2S$) or a halogen to form a monolithic porous structure of the corresponding sulfide or halide, or reacted with nitrogen or silicon to form a monolithic porous structure containing the corresponding nitride or silicide, respectively.

The removal of the microparticles and interconnects after infiltration can be accomplished by burn-out, chemical dissolution or a related method. For example, in the case of organic microparticles and interconnects, the structure may be heated to burn out the organics, for example at a temperature of at least 250° C. Other techniques are also possible, such as irradiation or plasma-assisted etching. For inorganic templates, such as silica, a chemical etchant such as hydrofluoric acid may be used to remove the microparticles and interconnects. Polystyrene and other organic polymer templates may be removed after formation of the monolithic porous structure by heating or dissolving with an organic solvent.

The monolithic porous structure formed upon removal of the microparticles and interconnects may have a porosity of from about 50% to about 99.8%, or from about 64% to about 99.8%, or from about 74% to about 99.8%, where porosity is defined as the volume fraction of voids and interconnects and is expressed in terms of a percentage. The void fraction of the monolithic porous structure depends in part on the size distribution of the microparticles, the shape of the microparticles, and the packing arrangement of the microparticles in the colloidal template. Four typical lattices or geometrical packing arrangements include face-centered cubic (FCC), simple cubic, tetrahedral, and random, where the volume fraction of microparticles in each, assuming perfect packing and monodisperse microparticles, is about 0.74 (FCC), 0.34 (tetrahedral), 0.52 (cubic), and about 0.64 (random). Due to the increase in neck size achieved with the present method, the porosity of a monolithic porous structure including randomly arranged voids is typically at least about 65%, at least about 68%, or at least about 70%, and could be up to 99.8%.

The size (average lateral dimension or average diameter) of the voids reflects the size of the microparticles of the colloidal template, and is preferably from about 0.2 micron to about 30 microns, from about 0.2 micron to about 5 microns, or from about 0.2 micron to about 2 microns, although larger or smaller sizes may be effective in some cases. For optimal charge transfer and fast energy storage and release in the case of battery electrodes, the porous conductive structure of the electrode generally includes pores of from about 0.2 micron to about 30 microns in size that are interconnected (or bi-continuous). Necks of the porous conductive structure between the voids providing the interconnection may have a lateral dimension (e.g., width or diameter) ranging from about 0.01 micron to about 10 microns.

The deposition of the electrochemically active material to form a battery electrode may entail electrodeposition or another coating technology (e.g., sol-gel or CVD). For example, a layer of NiOOH may be deposited onto a monolithic porous structure (e.g., a porous nickel structure) to fabricate a NiMH battery cathode. Similarly, a layer of MnOOH may be electrodeposited or otherwise coated onto the monolithic porous structure and then lithiated to form a Li-ion battery cathode. Other suitable active materials may include, for example, cobalt oxide, lithium iron phosphate, vanadium oxides, iron oxides and fluorides, or composite oxides for Li-ion cathode materials, and silicon, iron oxide, copper oxide, tin oxide, nickel phosphide, titanium oxide, nickel-tin alloy, copper-tin alloy for Li-ion anode materials. In the case of nickel-metal hydride battery electrodes, the active material is preferably nickel hydroxide, while lithium ion batteries may use lithiated manganese oxide as the active material.

Typically, the active material is deposited to a thickness of between about 5 nm and about 2 microns by a method such as pulsed electrodeposition in a suitable solution. The active material can also be deposited by electrophoretic methods from particle containing solutions as long as the particles are small enough to travel through the voids and necks of the monolithic porous structure or by gas-phase deposition methods when appropriate precursors exist.

Example 1

Fabrication of Colloidal Template and Monolithic Porous Structure

A suspension of silica spheres of 4 microns in diameter is cast on a substrate. After drying, a randomly-packed colloidal template is formed, as shown schematically in FIG. 1a. The thickness of the colloidal template can be controlled by the concentration of the suspension of silica spheres and the thickness of the suspension cast on the substrate.

A polydimethylsiloxane (PDMS) precursor, Sylgard 184, and a curing agent are dissolved into toluene at respective concentrations of 6 wt. % and 0.6 wt. %. Several drops of the mixture are spread into the dried colloidal template, as shown schematically in FIG. 1b.

Figures 2A, 2B, 2C, 2D:
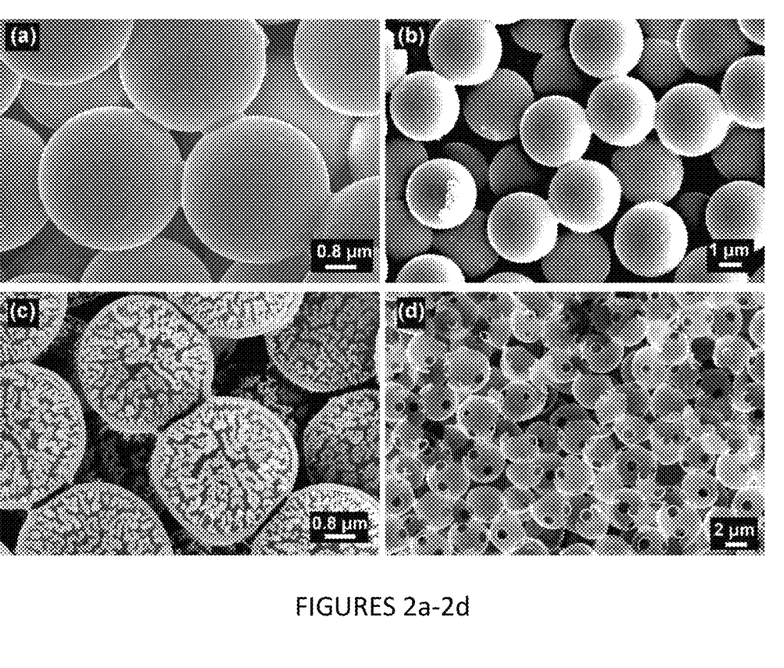
FIG. 2a is a scanning electron microscope (SEM) image of spherical silica microparticles connected by polydimethylsiloxane (PDMS) rings (interconnects)
FIG. 2b is an SEM image of the silica microparticles after calcination and tungsten chemical vapor deposition (CVD)
FIG. 2c shows an SEM image of the lattice of microparticles after the top has been opened by reactive ion etching (RIE)
FIG. 2d shows an SEM image of the monolithic porous structure that results once the template (microparticles and interconnects) are removed.

As the toluene evaporates, the low volatility components (Sylgard 184 and the curing agent in this case) move to the contact regions between two adjacent spheres due to capillary forces. After the solvent is largely evaporated, the PDMS precursors are cured at 80° C. overnight and PDMS rings are formed around the contact regions of two neighboring spheres. FIG. 2a provides a scanning electron microscope (SEM) image of PDMS rings formed between adjacent spherical microparticles.

Sintering in air at 400° C. for 2 h transforms the PDMS to $SiO_2$, (FIG. 2d). The whole structure becomes mechanically robust because the newly transformed $SiO_2$ rings bind the $SiO_2$ spheres together. More importantly, the interconnects formed by the local deposition process and sintering have a diameter that is a significant fraction of the diameter of the microparticles, and thus a highly interconnected monolithic porous structure may be formed from a subsequent inversion process. Metal CVD and electrodeposition are two common methods to invert the colloidal template.

FIG. 2b shows an SEM image of a tungsten-coated (or infilled) $SiO_2$ template made by the thermodecomposition of tungsten hexcarbonyl at 370° C. (CVD). If the metal is electroplated into the colloidal template, the removal of the $SiO_2$ microparticles and interconnects can be directly performed as long as the deposition is stopped before the metal overcoats the template. CVD-derived samples may be opened at the top of the colloidal template by reactive ion etching (FIG. 2c) or other methods such as mechanical polishing prior to removing the $SiO_2$ microparticles and interconnects.

Example 2

Fabrication of Colloidal Template and Monolithic Porous Structure

A PDMS ring precursor solution is prepared by dissolving 3 wt. % sylgard 184 base and 0.3 wt. % sylgard 184 curing agent into toluene.

$SiO_2$ microspheres of 1 μm diameter were obtained from Optical Fiber Corp. (Roanoke, Va.). After sintering at 600° C. for 5 hours, a microsphere suspension containing 20 wt. % solid is prepared with Millipore water. 0.5 wt % polyethylene glycol (MW 2000) is added to the suspension. The obtained suspension is shaken and sonicated for 2 to 5 minutes before use. Glass slides (or ITO coated glass slide) are cleaned with ethanol for 30 min in an ultrasonicator. After plasma treatment, the substrates are placed on a hot plate (about 50-60° C.). The $SiO_2$ suspension is dropped on the substrate. Upon drying, a random-packed $SiO_2$ template is formed.

The obtained samples are then baked at about 100-150° C. for about 2 hours in air and then coated with a few nanometers of $Al_2O_3$ by 5 to 10 cycles of atomic layer deposition (ALD). The samples are slowly dipped into the PDMS precursor solution. After about 1 min, all the gas in the porous colloidal structure has been driven out and replaced with the PDMS precursor-containing solution. The samples are pulled out of the solution at a rate between 5 mm/min and 5 cm/min. As the toluene evaporates, the PDMS precursors aggregate around the contact regions between two adjacent microspheres, forming rings. The samples are cured at 100° C. overnight. The PDMS precursors are converted to PDMS rings at the contact regions during the cure. After sintering (or calcining) at 400° C. for 5 hours in air, the PDMS is converted to $SiO_2$. The samples from this step are ready for metallization (conformal coating with a conductive material).

At least four metallization technologies can be used: 1) nickel CVD with nickel tetracarbonyl, nickelocene, or other nickel metallorganic chemicals; 2) nickel oxide ALD and reduction of oxide, where Ni-amidinate and $H_2O$ are used as precursors; 3) electroplating; and 4) electroless plating. After metallization is completed, the samples are immersed into 20 wt. % HF solution and sonicated for a short time until both the $SiO_2$ microparticles and the $SiO_2$ rings are dissolved.

The conformal metal coating is detached from the $SiO_2$ substrate (microparticles and rings) when HF etches the $SiO_2$, and a free standing monolithic porous metal structure is thereby obtained.

Example 3

Geometrical Calculations

Figure 4:
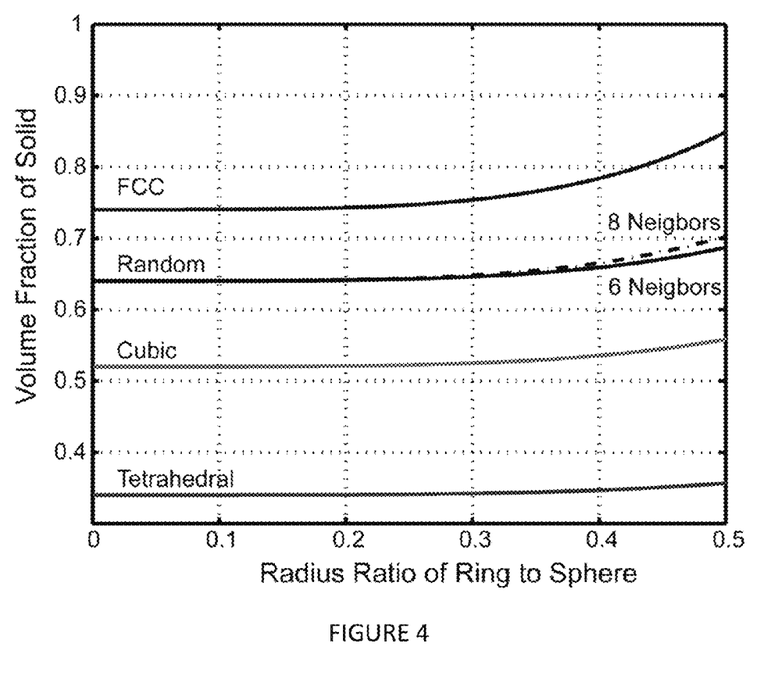
FIG. 4 shows the volume fraction of solid material (including the microparticles and the rings formed after curing) in four typical lattices or geometrical packing arrangements, face-centered cubic (FCC), simple cubic, tetrahedral, and randomly-ordered.

To estimate the volume fraction of solid content in the colloidal template and design the ring size, a simple geometrical calculation is made. FIG. 3 shows the relationship between (a) the ratio of the volume of a ring to the volume of a microparticle and (b) the ratio of the outside radius of a ring to the radius of a microparticle. FIG. 4 shows the volume fraction of solid material (including the microparticles (e.g., $SiO_2$) and the rings formed after curing (e.g., PDMS)) in four typical lattices or geometrical packing arrangements, face-centered cubic (FCC), simple cubic, tetrahedral, and randomly-ordered. Prior to forming the rings (interconnects between microparticles), the lattices include the following volume fraction of solid material: 0.74 (FCC), 0.34 (tetrahedral), 0.52 (cubic), and about 0.64 (random). In the random lattice, the number of contacting neighbors may vary, but is generally 6-8, while a perfect FCC lattice includes 12 contacting neighbors.

When the PDMS is converted into $SiO_2$, the volume of the rings decreases by 25-50%, but as can be seen in FIGS. 3 and 4, the volume fraction of the rings is extremely small at all but the highest radius ratio, and thus this volume change does not significantly change the free volume in the system.

Table 1 demonstrates the influence of the precursor concentration on the volume fraction of solids (including rings and microparticles) in a randomly ordered lattice, assuming the colloidal template or lattice includes 64 vol. % microparticles prior to forming the rings, and each microparticle has 8 contacting neighbors (or contact regions) on average. It is further assumed that the concentration of the PDMS precursor in Table 1 refers to that of the sylgard 184 base, and the amount of sylgard 184 curing agent is 10% of the sylgard 184 base. When the film is cast into the template, the solvent/air interface is flat and fills the entire void space in the template. The radius of rings is defined as the outside radius.

Figure 5:
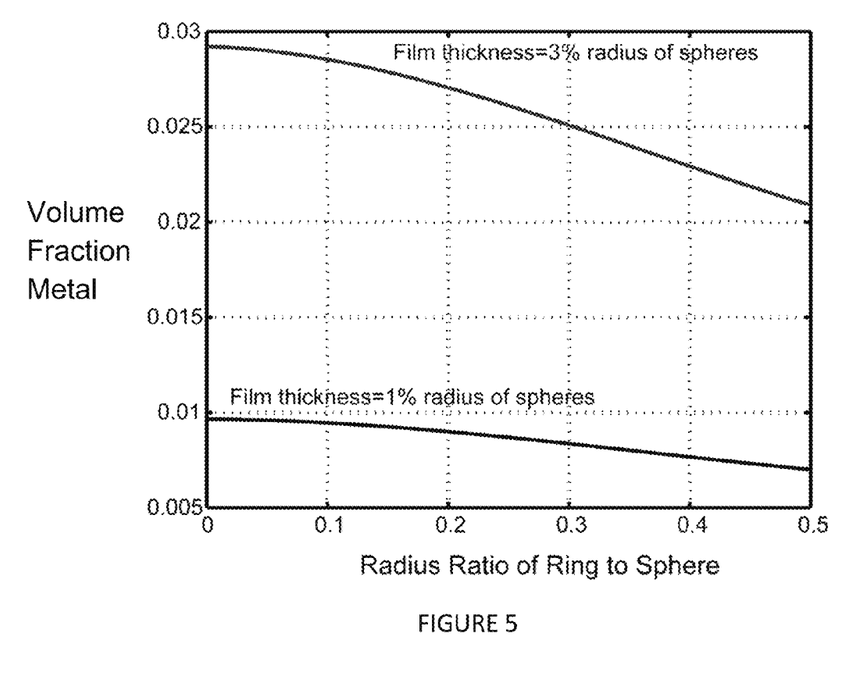
FIG. 5 models the volume fraction of a conformally-coated metal film that may be formed by CVD or ALD after removal of the microparticles and rings.

FIG. 5 models the volume fraction of a conformally-coated metal film that may be formed by CVD or ALD after removal of the $SiO_2$ microparticles and PDMS rings. Randomly packed spherical microparticles make up the colloidal templates, and the contact regions between the microparticles are interconnected by the PDMS rings, where the radius of the rings refers to an outside radius.

TABLE 1

Relationship of Precursor Concentration to Volume Fraction Solids and Porosity of Colloidal Template

| Precursor Concentration (wt. %) | Volume Fraction of Solids (vol. %) | Porosity of Colloidal Template (or Solid Content of Infilled Metal) (vol. %) |
|---|---|---|
| 0 | 64 | 36 |
| 3 | 66 | 34 |
| 6 | 68 | 32 |
| 10 | ~73[a] | 27 |

[a]Some channels between three closely packing spheres are entirely filled with PDMS because of the high solids concentration. The number is an estimate based on the average ring size.

The electropolishing of a monolithic porous structure in order to achieve increased neck openness is described in U.S. Pat. No. 7,872,563, "Variably Porous Structures," issued Jan. 18, 2011 to Braun and Yu and hereby incorporated by reference in its entirety. The local deposition-based method of the present disclosure boasts several advantages over the previous approach. First, the new method is general for forming monolithic porous structures having large necks from metals, oxides and other materials because the new invention does not require the infiltrated material to be electrically conductive, or even etchable by any process. In addition, a conformal deposition may be used instead of a bottom-up deposition process, and the final monolithic porous structure has very high porosity and interconnectivity. The third improvement is that a randomly-packed colloidal template can be easily employed since the large necks in the resultant structure make removal of the template (microparticles and interconnects) easier.

Although the present invention has been described with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A method of forming a conductive porous structure, the method comprising:
   forming a lattice of microparticles from a suspension of microparticles by self-assembly and drying, the microparticles of the lattice being in contact with adjacent microparticles of the lattice at contact regions therebetween;
   after forming the lattice of microparticles by self-assembly and drying, annealing the lattice to strengthen the contact between adjacent microparticles, thereby forming an annealed lattice of microparticles;
   after the annealing, exposing the annealed lattice to a solution comprising a solvent and a precursor material;
   removing the solvent from the solution, the precursor material moving to the contact regions;
   after removing the solvent, curing the precursor material to form a ring comprising a polymer around each of the contact regions, thereby creating interconnects between adjacent microparticles of the annealed lattice and enhancing the connectivity of the annealed lattice;
   after forming the ring around each of the contact regions, heating the rings at a temperature of from about 200° C. to about 500° C. to transform the rings into calcined rings comprising $SiO_2$;
   after heating the rings, infilling the annealed lattice with a conductive material, the conductive material coating the microparticles of the annealed lattice and the interconnects; and
   after the infilling, removing the microparticles of the annealed lattice and the interconnects to obtain a monolithic porous structure comprising the conductive material and including (a) voids defined by the microparticles and (b) necks between the voids defined by the interconnects.

2. The method of claim 1, wherein curing the precursor material comprises heating the precursor material at temperature of from about 50° C. to about 200° C.

3. The method of claim 1, wherein curing the precursor material comprises chemically treating the precursor material.

4. The method of claim 1, wherein the polymer comprises silicon.

5. The method of claim 4, wherein the polymer is selected from the group consisting of: polysiloxanes, polycarbosilanes, polysilazanes, and polysilanes.

6. The method of claim 5, wherein the polymer is a polysiloxane selected from the group consisting of: polydimethylsiloxane and poly(methylsilsesquioxane).

7. The method of claim 1, wherein the precursor material is present in the solution at a concentration of from about 1 wt. % to about 20 wt. %.

8. The method of claim 1, wherein the solution further comprises a curing agent.

9. The method of claim 1, wherein the solvent is selected from the group consisting of water, ethanol, methanol, isopropyl alcohol, acetone, methyl ethyl ketone, acetonitrile, toluene, pentane, hexane, heptane, xylene, and benzene.

10. The method of claim 1, wherein a ratio of an outer diameter of each of the rings to a diameter of each of the microparticles is at least about 0.1.

11. The method of claim 10, wherein the ratio is from about 0.1 to about 0.8.

12. The method of claim 1, wherein the microparticles comprise $SiO_2$.

13. The method of claim 1, wherein the microparticles comprise a polymer.

14. The method of claim 1, wherein the annealed lattice is disordered.

15. The method of claim 1, further comprising, after the removing, depositing an electrochemically active material on the monolithic porous structure, thereby forming a porous battery electrode.

16. The method of claim 1, further comprising, after the removing, chemically transforming the conductive material to comprise an electrochemically active material, thereby forming a porous battery electrode.

17. A method of forming a conductive porous structure, the method comprising:
   forming a lattice of microparticles from a suspension of microparticles by self-assembly and drying, the microparticles of the lattice being in contact with adjacent microparticles of the lattice at contact regions therebetween;
   after forming the lattice of microparticles by self-assembly and drying, annealing the lattice to strengthen the contact between adjacent microparticles, thereby forming an annealed lattice of microparticles;

after the annealing, exposing the annealed lattice to a solution comprising a solvent and a precursor material;

removing the solvent from the solution, the precursor material moving to the contact regions;

after removing the solvent, curing the precursor material to form a ring comprising a polymer around each of the contact regions, thereby creating interconnects between adjacent microparticles of the annealed lattice and enhancing the connectivity of the annealed lattice;

after forming the ring around each of the contact regions, infilling the annealed lattice with a conductive material, the conductive material coating the microparticles of the annealed lattice and the interconnects;

after the infilling, removing the microparticles of the annealed lattice and the interconnects to obtain a monolithic porous structure comprising the conductive material and including (a) voids defined by the microparticles and (b) necks between the voids defined by the interconnects; and after removing the microparticles, depositing an electrochemically active material on the monolithic porous structure, thereby forming a porous battery electrode.

18. A method of forming a conductive porous structure, the method comprising:

forming a lattice of microparticles from a suspension of microparticles by self-assembly and drying, the microparticles of the lattice being in contact with adjacent microparticles of the lattice at contact regions therebetween;

after forming the lattice of microparticles by self-assembly and drying, annealing the lattice to strengthen the contact between adjacent microparticles, thereby forming an annealed lattice of microparticles;

after the annealing, exposing the annealed lattice to a solution comprising a solvent and a precursor material;

removing the solvent from the solution, the precursor material moving to the contact regions;

after removing the solvent, curing the precursor material to form a ring comprising a polymer around each of the contact regions, thereby creating interconnects between adjacent microparticles of the annealed lattice and enhancing the connectivity of the annealed lattice;

after forming the ring around each of the contact regions, infilling the annealed lattice with a conductive material, the conductive material coating the microparticles of the annealed lattice and the interconnects;

after the infilling, removing the microparticles of the annealed lattice and the interconnects to obtain a monolithic porous structure comprising the conductive material and including (a) voids defined by the microparticles and (b) necks between the voids defined by the interconnects; and after removing the microparticles, chemically transforming the conductive material to comprise an electrochemically active material, thereby forming a porous battery electrode.

* * * * *